United States Patent
Metchev

(10) Patent No.: US 6,530,029 B1
(45) Date of Patent: Mar. 4, 2003

(54) I²C/SMBUS START-STOP DETECTING CIRCUIT THAT REDUCES THE LIKELIHOOD OF STALLING THE BUS DUE TO GLITCHES ON THE DATA LINE

(75) Inventor: Robert Metchev, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/404,011

(22) Filed: Sep. 23, 1999

(51) Int. Cl.⁷ .............. G06S 11/00; G06F 13/42

(52) U.S. Cl. .............. 713/500; 713/400; 714/814

(58) Field of Search .............. 713/500, 400; 714/814, 815, 816

(56) References Cited

U.S. PATENT DOCUMENTS

| | | | | |
|---|---|---|---|---|
| 4,371,975 A | * | 2/1983 | Dugan | 375/376 |
| 4,756,006 A | * | 7/1988 | Rickard | 375/219 |
| 5,878,234 A | * | 3/1999 | Dutkiewicz et al. | 710/110 |
| 5,925,135 A | * | 7/1999 | Trieu et al. | 713/400 |

\* cited by examiner

Primary Examiner—Thomas Lee
Assistant Examiner—Eric Chang
(74) Attorney, Agent, or Firm—Mark C. Pickering

(57) ABSTRACT

Effects of glitches on the data line which can cause an I²C bus (or SMBus) interface to invalidate a detected I²C start command or to erroneously detect an I²C start command, which occurs when the data signal transitions from a logic high to a logic low while the clock signal has a logic high, are reduced by detecting the logic state of the data signal when the clock signal next transitions from a logic high to a logic low.

12 Claims, 3 Drawing Sheets

FIG. 2A  SCL
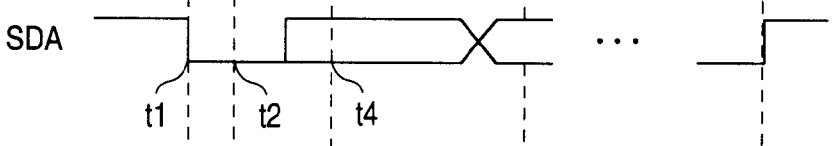
FIG. 2B  SDA
FIG. 2C  FSS
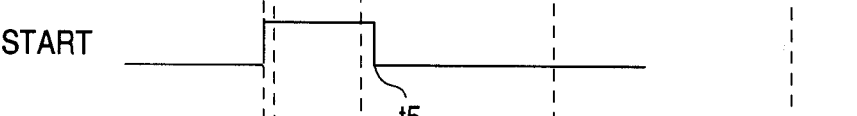
FIG. 2D  START
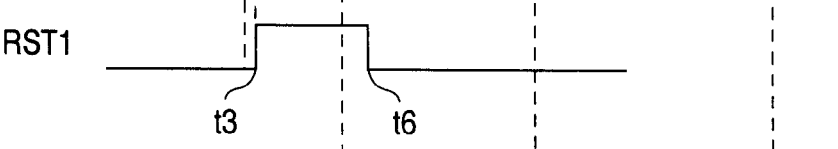
FIG. 2E  RST1
FIG. 2F  RST2
FIG. 2G  STOP
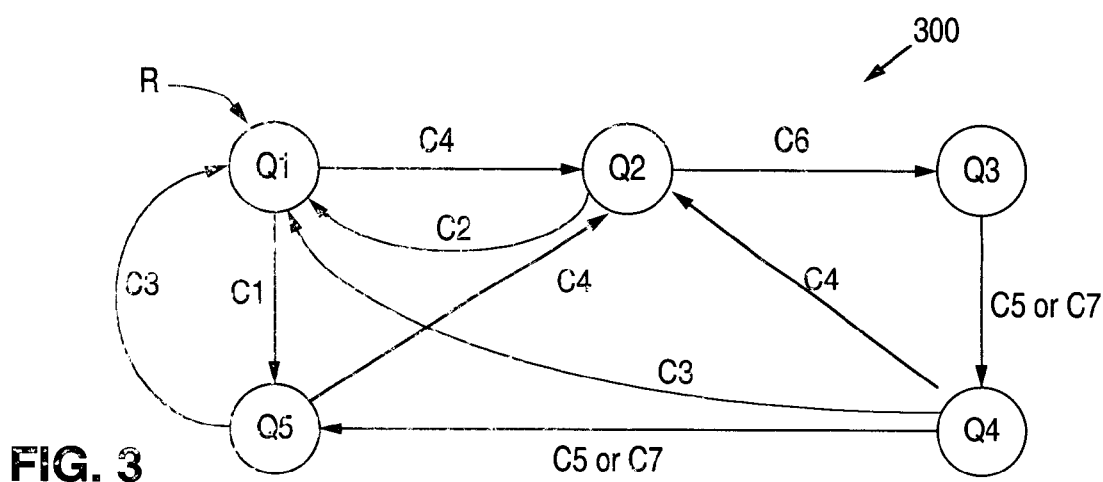
FIG. 3

I²C/SMBUS START-STOP DETECTING CIRCUIT THAT REDUCES THE LIKELIHOOD OF STALLING THE BUS DUE TO GLITCHES ON THE DATA LINE

BACKGROUND OF THE INVENTION

1. Field of the Invention

The present invention relates to an I²C/SMBus system and, more particularly, to an I²C/SMBus start-stop detecting circuit that reduces the likelihood of stalling the bus due to glitches on the data line.

2. Description of the Related Art

In I²C and SMBus systems, only two bidirectional lines are used for communication between devices: a serial data line for transferring a data signal, and a serial clock line for transferring a clock signal. (The I²C Bus and the SMBus are different busses which, although they are defined by different specifications, follow the same protocol. As a result, each reference to the I²C Bus also refers to the SMBus.) During data transfer, the high or low state of the data signal can only change when the clock signal is low.

Within the procedure of the I²C bus specification, two unique situations arise which are defined as I²C start and I²C stop conditions. The I²C start condition occurs when the data signal transitions from a high to a low when the clock signal is high, while the I²C stop condition occurs when the data signal transitions from a low to a high when the clock signal is high.

Microcontrollers can identify the I²C start and I²C stop conditions by sampling the data line at least twice per clock period to identify a transition in the data signal, or by using a dedicated I²C interface. Slave circuits which do not have access to any faster internal clock signal that could be used to sample the data line, however, must utilize a dedicated I²C interface.

Conventionally, a dedicated I²C interface identifies the I²C start condition by sampling the level of the clock signal when the falling edge of the data signal is detected. However, glitches on the data line during arbitration in a multi-master environment may erroneously invalidate a previously detected I²C start condition. Furthermore, glitches on the data line while the I²C bus is in an idle state may be erroneously interpreted as an I²C start condition. This, in turn, can lead the interface to lock up and stall the bus.

Thus, there is a need for an I²C interface which reduces the likelihood that a glitch on the data line invalidates a detected I²C start condition or is erroneously detected as an I²C start condition.

SUMMARY OF THE INVENTION

By evaluating the start condition twice, the present invention provides an I²C start-stop detection circuit that reduces the likelihood that a glitch on the data line invalidates a detected I²C start condition or is erroneously detected as an I²C start condition.

In accordance with the present invention, a start-stop detection circuit includes a first start detecting circuit that is connectable to a clock line to receive a clock signal, and a data line to receive a data signal. In addition, the detecting circuit is also connected to a first reset line to receive a first reset signal and to a first-step line to output a first-step signal.

The start-stop detection circuit also includes a second start detecting circuit that is connectable to the clock line to receive the clock signal. Further, the second start detecting circuit is also connected to the first-step line to receive the first-step signal, a second reset line to receive a second reset signal, and a start line to output a start signal.

In addition, a reset circuit is connectable to the clock line to receive the clock signal, and a master reset line to receive a master reset signal. The reset circuit is also connected to the start line to receive the start signal, the first reset line to output the first reset signal, and the second reset line to output the second reset signal.

Further, a stop detection circuit is connectable to the clock line to receive the clock signal, the data line to receive the data signal, and the reset line to receive the master reset signal. In addition, the stop detection circuit is also connected to the start line to receive the start signal.

In the present invention, the first start detecting circuit includes an edge detecting circuit and a level detecting circuit. The edge detecting circuit detects a high-to-low voltage transition on the data line, while the level detecting circuit latches and outputs the logic state of the clock signal to form the first-step signal when the edge detecting circuit detects the transition on the data line.

In addition, the second start detecting circuit includes an edge detecting circuit and a level detecting circuit. The edge detecting circuit detects a high-to-low voltage transition on the clock line, while the level detecting circuit latches and outputs the logic state of the first-step signal to form the start signal when the edge detecting circuit of the second start detecting circuit detects the transition on the clock line.

Further, the reset circuit includes a first logic circuit and a second logic circuit. The first logic circuit outputs the first reset signal when the logic state of the master reset signal indicates that a reset has been commanded, or the logic state of the start signal indicates that a valid I²C start condition has been detected.

The second logic circuit outputs the second reset signal when the logic state of the master reset signal indicates that a reset has been commanded, or when, on a next rising edge of the clock signal, the logic state of the start signal indicates that a valid start condition has been detected.

In addition, the stop detecting circuit includes an edge detecting circuit and a level detecting circuit. The edge detecting circuit detects a low-to-high voltage transition on the data line, while the level detecting circuit latches and outputs the logic state of the clock signal to form the stop signal when the edge detecting circuit of the stop detecting circuit detects the transition on the data line.

The present invention also includes a method for operating the start-stop detection circuit. The method begins with the step of detecting a high-to-low voltage transition on the data line. The logic state of the clock signal is latched and output to form the first-step signal when the high-to-low transition is detected on the data line.

The method continues with the step of detecting a high-to-low voltage transition on the clock line.

The logic state of the first-step signal is latched and output to form the start signal when the high-to-low transition is detected on the clock line.

A better understanding of the features and advantages of the present invention will be obtained by reference to the following detailed description and accompanying drawings which set forth an illustrative embodiment in which the principles of the invention are utilized.

BRIEF DESCRIPTION OF THE DRAWINGS

FIGS. 2A–2G are timing diagrams further illustrating the operation of start-stop detection circuit 100 in accordance with the present invention.

FIG. 3 is a block diagram illustrating a state machine 300 in accordance with the present invention.

DETAILED DESCRIPTION

Figure 1:
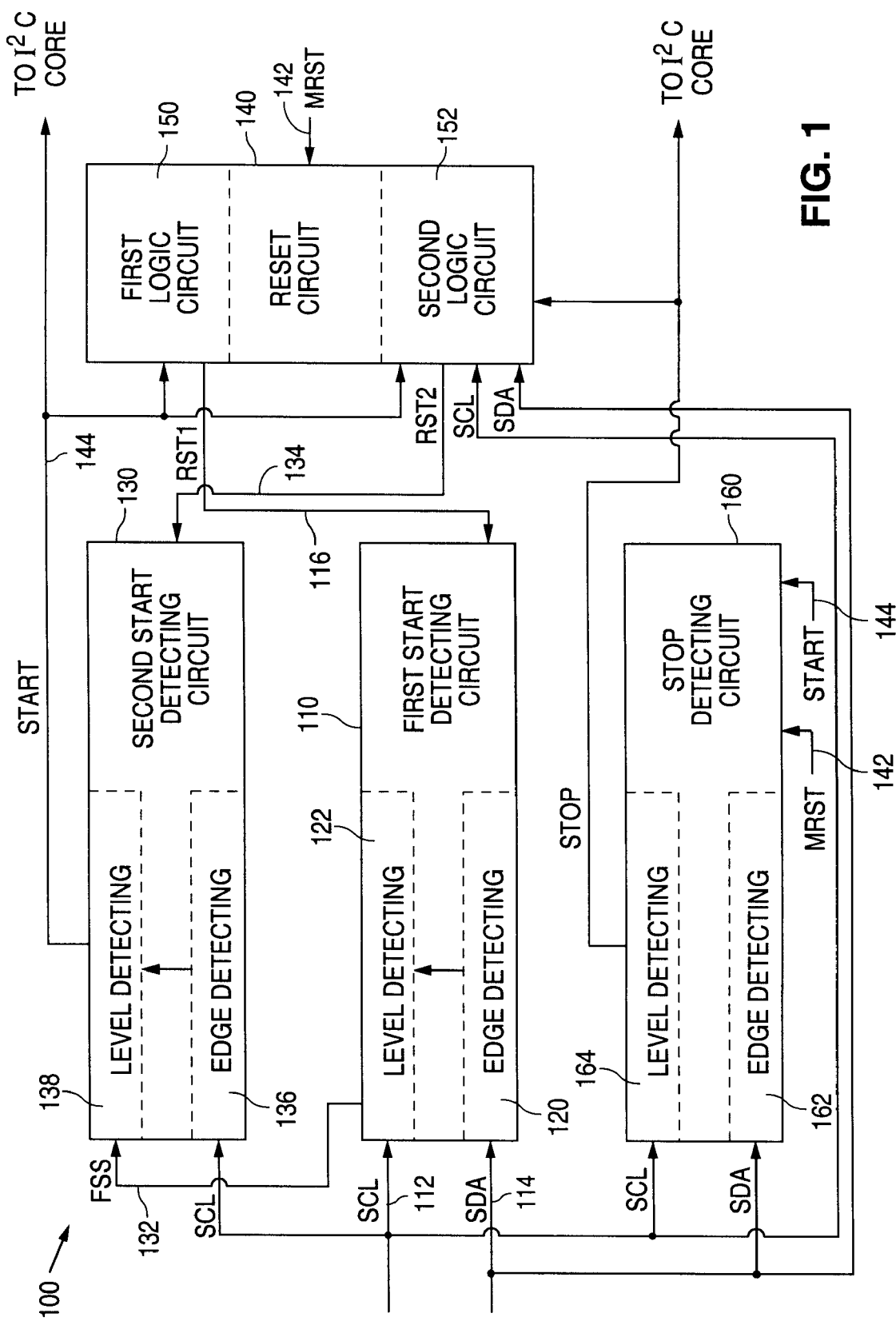
FIG. 1 is a block diagram illustrating an I²C/SMBus start-stop detection circuit 100 in accordance with the present invention.

FIG. 1 shows a block diagram that illustrates an I²C/SMBus start-stop detection circuit 100 in accordance with the present invention. (The I²C Bus and the SMBus are different busses which, although they are defined by different specifications, follow the same protocol. As a result, each reference to the I²C Bus also refers to the SMBus.) As described in greater detail below, circuit 100 reduces the likelihood that a glitch will stall an I²C by detecting the start condition twice.

As shown in FIG. 1, detection circuit 100 includes a first start detecting circuit 110 that is connectable to a clock line 112 to receive a clock signal SCL, and a data line 114 to receive a data signal SDA. Circuit 110 is also connected to a first reset line 116 to receive a first reset signal RST1.

Detecting circuit 110 includes an edge detecting circuit 120 that detects a high-to-low voltage transition on data line 114, and a level detecting circuit 122 that latches and outputs the logic state of the clock signal SCL to form a first-step signal FSS when circuit 120 detects the transition on line 114.

The first-step signal FSS is preferably set to have a logic low when a high-to-low voltage transition occurs and the clock signal SCL has a logic low, and a logic high when a high-to-low voltage transition occurs and the clock signal SCL has a logic high.

In the I²C specification, a valid start command occurs when the clock signal SCL has a logic high during the transition. Thus, when the first-step signal FSS has a logic high, an I²C start command has been detected.

Start-stop detection circuit 100 also includes a second start detecting circuit 130 which is connectable to clock line 112 to receive the clock signal SCL. In addition, circuit 130 is also connected to a first-step line 132 to receive the first-step signal FSS, and a second reset line 134 to receive a second reset signal RST2.

Circuit 130 includes an edge detecting circuit 136 that detects a high-to-low voltage transition on clock line 112, and a level detecting circuit 138 that latches and outputs the logic state of the first-step signal FSS to form a start signal START when circuit 136 detects the transition on line 112.

The start signal START is preferably set to have a logic low when a high-to-low voltage transition occurs and the data signal SDA has a logic high, and a logic high when a high-to-low voltage transition occurs and the data signal SDA has a logic low.

In the I²C specification, when a valid start command is issued, the logic state of the data signal SDA is always low when the clock signal SCL next transitions from a logic high to a logic low. However, when a glitch triggers the logic state of the clock signal SCL to be latched, a high voltage is typically present when the clock signal SCL next falls.

Thus, when the start signal START has a logic high, the I²C start command has been detected twice. A start signal START with a logic low, in turn, indicates that a glitch triggered the clock signal SCL to be latched.

FIGS. 2A–2G show timing diagrams that further illustrate the operation of start-stop detection circuit 100 in accordance with the present invention. As shown in FIGS. 2A–2G, edge detecting circuit 120 detects the falling edge of the data signal SDA at time t1.

In response to the falling edge, level detecting circuit 122 latches the voltage level of the clock signal SCL. When the clock signal SCL is low, circuit 122 sets the first-step signal FSS to a logic low which, in turn, indicates that an I²C start command was not received. On the other hand, as shown in FIG. 2C, when the clock signal SCL is high, circuit 122 sets the first-step signal FSS to a logic high to indicate that an I²C start command has been received.

Edge detecting circuit 136 then detects the falling edge of the clock signal SCL at time t2. In response to the falling edge, level detecting circuit 138 latches the voltage level of the data signal SDA. When the data signal SDA is high, circuit 138 sets the start signal START to a logic low which, in turn, indicates that a glitch was present on data line 114.

When the data signal SDA is low, circuit 138 sets the start signal START to a logic high which, in turn, indicates that a valid I²C start command has been detected twice. The I²C core interprets the logic high state of the start signal START to be a valid start command, and begins data reception in accordance with the I²C specification.

Thus, in accordance with the present invention, a valid start command is not issued to the I²C core unless both the clock signal SCL is high when the data signal SDA falls, and the data signal is low the very next time the clock signal SCL falls. As a result, the present invention reduces the likelihood that a momentary glitch will stall an I²C bus.

Returning again to FIG. 1, start-stop detection circuit 100 also includes a reset circuit 140 which is connectable to clock line 112 to receive the clock signal SCL, and a master reset line 142 to receive a master reset signal MRST. In addition, circuit 140 is also connected to a start line 144 to receive the start signal START.

Reset circuit 140 includes a first logic circuit 150 that outputs the first reset signal RST1 when either the logic state of the master reset signal MRST indicates that a reset has been commanded, or the logic state of the start signal START indicates that a valid I²C start condition has been detected.

As shown in FIG. 2E, when a logic high indicates that a valid I²C start condition has been detected, the first reset signal RST1 rises to a logic high at time t3. The difference between time t2 and time t3 represents a propagation delay. The first reset signal RST1 then causes the logic state of the first-step signal FSS to fall.

Returning again to FIG. 1, reset circuit 140 also includes a second logic circuit 152 that outputs the second reset signal RST2 when the logic state of the master reset signal MRST indicates that a reset has been commanded. Circuit 152 also outputs the second reset signal RST2 on the next rising edge of the clock signal SCL when the logic state of the start signal START indicates that a valid start condition has been detected.

As shown in FIG. 2F, on the rising edge of the next clock signal SCL, at time t4, second logic circuit 152 outputs the second reset signal RST2 when the start signal START indicates that a valid start command has been detected.

The second reset signal RST2 then causes the logic state of the start signal START to fall at time t5. As a result, the start signal START is limited to a pulse width which is approximately one-half the period of the clock signal SCL.

The difference between time t4 and time t5 represents a propagation delay.

The falling start signal START causes the logic state of the first reset signal RST1 to then fall at time t6. The difference between time t5 and time t6 represents a propagation delay. The second reset signal RST2 then falls at time t7 on the next rising edge of the clock signal SCL.

Returning again to FIG. 1, start-stop detection circuit 100 further includes a stop detection circuit 160 that is connectable to clock line 112 to receive the clock signal SCL, data line 114 to receive the data signal SDA, and reset line 142 to receive the master reset signal MRST. Circuit 160 is also connected to start line 144 to receive the start signal START.

Circuit 160 includes an edge detecting circuit 162 that detects a low-to-high voltage transition on data line 114, and a level detecting circuit 164 that latches and outputs the logic state of the clock signal SCL to form a stop signal STOP when circuit 162 detects the transition on line 114.

The stop signal STOP is preferably set to have a logic low when a low-to-high voltage transition occurs and the clock signal SCL has a logic low, and a logic high when a low-to-high voltage transition occurs and the clock signal SCL has a logic high.

In the I²C specification, a valid stop command occurs when the clock signal SCL has a logic high during the transition. Thus, when the stop signal STOP has a logic high, an I²C stop command has been detected.

As shown in FIG. 2G, when the clock signal SCL is high, circuit 164 sets the stop signal STOP to a logic high at time t8 to indicate that an I²C stop command has been received. The I²C core interprets the logic high to be a valid stop command, and ends data reception in accordance with the I²C specification. On the other hand, the I²C core interprets a logic low to be an invalid stop command, and takes no action.

FIG. 3 shows a block diagram that illustrates a state machine 300 in accordance with the present invention. As shown in FIG. 3, state machine 300 has five states: Q1, Q2, Q3, Q4, and Q5. Table 1 lists the nine possible input conditions (R and C1–C8) that can cause state machine 300 to move from one state to another.

TABLE 1

| Condition | reset | SDA | SCL | Note |
|---|---|---|---|---|
| R | 1 | x | x | Asynchronous Reset |
| C1 | 0 | r | 0 | |
| C2 | 0 | f | 0 | |
| C3 | 0 | r | 1 | I²C STOP Condition |
| C4 | 0 | f | 1 | I²C START Condition |
| C5 | 0 | 0 | r | |
| C6 | 0 | 0 | f | 2nd Eval of START |
| C7 | 0 | 1 | r | |
| C8 | 0 | 1 | f | | where:

x=don't care, r=rising edge, transition from logic 0 to logic 1, and f=falling edge, transition from logic 1 to logic 0.

Table 2 lists the states and the conditions that allow state machine 300 to move from one state to another.

TABLE 2

| Current State | R | C1 | C2 | C3 | C4 | C5 | C6 | C7 | C8 | Stop | Start |
|---|---|---|---|---|---|---|---|---|---|---|---|
| Q1 | Q1 | Q5 | — | — | Q2 | — | — | — | — | 1 | 0 |
| Q2 | Q1 | X | Q1 | — | — | X | Q3 | — | — | 1 | 0 |
| Q3 | Q1 | — | — | X | X | Q4 | X | Q4 | X | 0 | 1 |
| Q4 | Q1 | — | — | Q1 | Q2 | Q5 | — | Q5 | — | 0 | 0 |
| Q5 | Q1 | — | — | Q1 | Q2 | — | — | — | — | 0 | 0 | where:

X = don't care, and

— = No change in state.

In operation, state Q1 is the "initial" or "idle" state. State machine 300 remains in state Q1 as long as there is no traffic on the I²C bus, and enters state Q1 in response to the master reset signal MRST shown as condition R.

State Q1 outputs the start and stop signals START and STOP to the I²C core with logic states that indicate that the start signal START is invalid and the stop signal STOP is valid. As a result, the I²C core clears the register that holds the start command, and sets the register that holds the stop command.

As shown in FIG. 3 and Tables 1 and 2, state machine 300 moves from state Q1 to state Q2 in response to condition C4 which represents the detection of the I²C start condition (at time t1 in FIGS. 2A–2G). In addition, state machine 300 also moves from state Q1 to state Q5 in response to condition C1 which represents the rising edge of a data pulse. Thus, if state machine 300 is in state Q1 during data transfer, machine 300 moves to state Q5

State Q2, which allows the start condition to be evaluated twice, is an intermediate state that outputs the start and stop signals START and STOP to the I²C core with the same logic states as in state Q1.

State machine 300 moves from state Q2 to state Q3 in response to condition C6 which represents the detection of the second start condition (at time t2 in FIGS. 2A–2G). Further, state machine 300 also moves from state Q2 to state Q1 in response to condition C2 which represents the falling edge of a data pulse. Thus, if state machine 300 is in state Q2 during data transfer, machine 300 moves to state Q1.

State Q3 is the start state that outputs the start and stop signals START and STOP with logic states that indicate that the start signal START is valid and the stop signal STOP is invalid. As a result, the I²C core sets the register that holds the start command, and clears the register that holds the stop command.

State machine 300 moves from state Q3 to state Q4 in response to condition Cs or C7. Conditions C5 and C7 both represent the first data pulse (at time t4 in FIGS. 2A–2G) after the start condition; C5 representing a logic low on the data signal SDA, and C7 representing a logic high on the data signal SDA. In addition, the I²C core receives the start signal START synchronously with the clock signal SCL. As a result, the I²C core must be cleared with the rising edge of the clock signal SCL (at time t4).

State Q4 is a second intermediate state that is active for only one clock period. At the beginning of the clock period, state Q4 outputs both the start and stop signals START and STOP with logic states that indicate that both signals are invalid. As a result, the I²C core clears the registers that hold the start and stop commands. Thus, as noted above, the start signal START is active for less than one clock period.

State machine 300 moves from state Q4 to state Q5 in response to condition C5 or C7. At this point, conditions C5 and C7 both represent the second data pulse (at time t7 in FIGS. 2A–2G). State Q5 is the "busy" state where data transfer takes place. State Q5 outputs both the start and stop signals START and STOP with logic states that indicate that both signals are invalid. As a result, the I²C core clears the registers that hold the start and stop commands.

State machine 300 also moves from state Q4 to state Q2 in response to condition C4 which represents the I²C start condition, and to state Q1 in response to condition C3 which represents the I²C stop condition. In addition, state machine 300 further moves from state Q5 to state Q1 in response to condition C3 which represents the I²C stop condition. Further, if state Q5 is entered from state Q1, state Q5 acts as a buffer state without any specific function.

Figure 4:
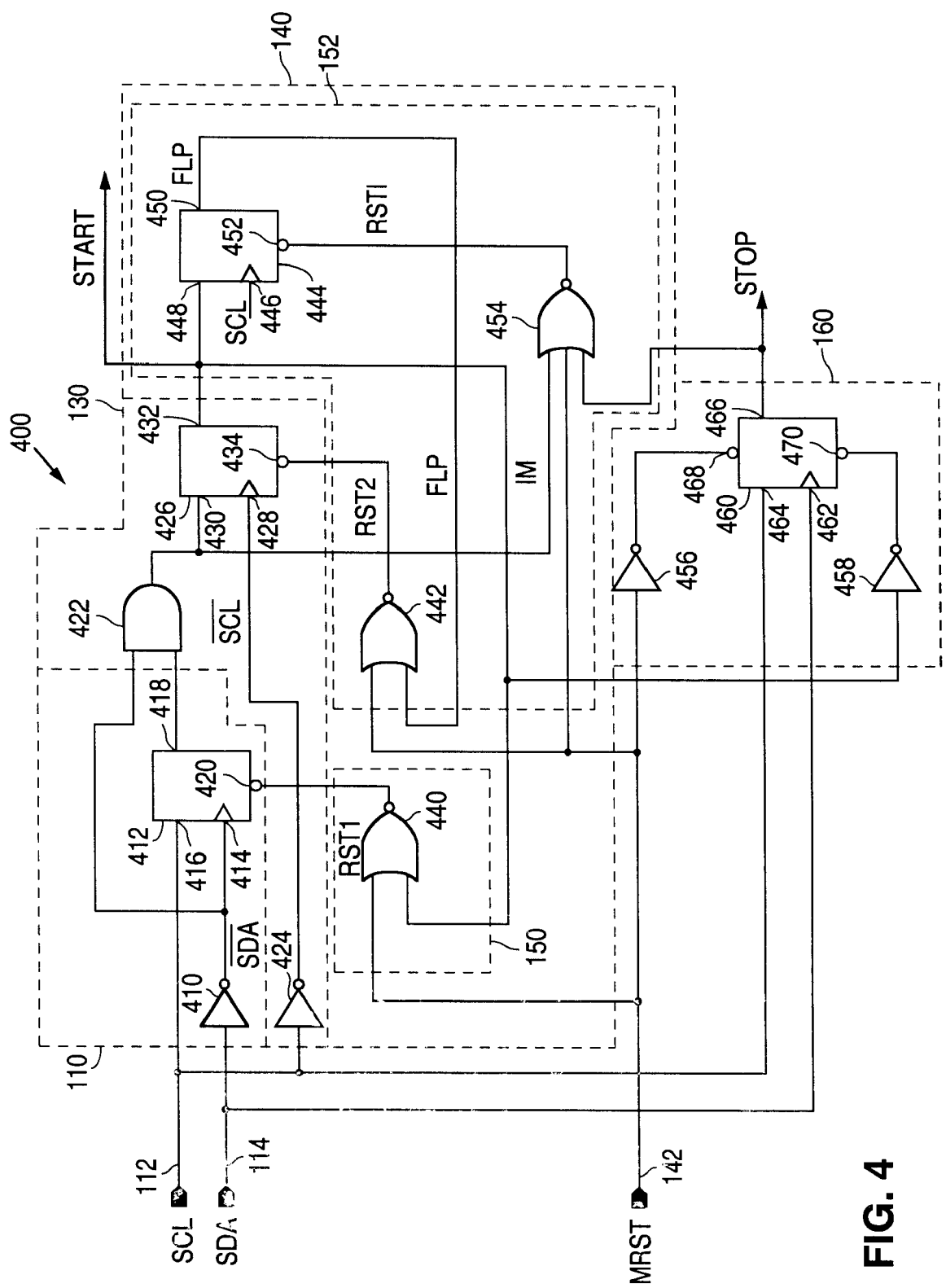
FIG. 4 is a block diagram illustrating an I²C start-stop detection circuit 400 in accordance with the present invention.

FIG. 4 shows a block diagram that illustrates an I²C start-stop detection circuit 400 in accordance with the present invention. Circuit 400 represents one embodiment of circuit 100, and is not a limitation to circuit 100.

As shown in FIG. 4, first start detecting circuit 110 is implemented with an inverter 410 that is connectable to receive the data signal SDA, and an edge-triggered flip-flop 412. Flop 412 has edge detecting circuitry associated with a clock input 414, and level detecting circuitry associated with a data input 416 and a data output 418.

Clock input 414 is connected to receive an inverted data signal SDAbar from inverter 410, while data input 416 is connectable to receive the clock signal SCL. Further, flop 412 has a reset input 420 that is connectable to receive the first reset signal RST1.

In operation, the falling edge of the data signal SDA (at time t1 in FIGS. 2A–2G) causes inverter 412 to output the rising edge of inverted data signal SDAbar which, in turn, causes the logic state of the clock signal SCL to be latched and output as the first-step signal FSS. Thus, when an I²C start command is received, the clock signal SCL and the output from flop 412 are both logic highs.

Further, second start detecting circuit 130 is implemented with an AND gate.422 that is connected to the outputs of inverter 410 and flop 412, and an inverter 424 that is connectable to receive the clock signal SCL. Circuit 130 also includes an edge-triggered flip-flop 426 which has edge detecting circuitry associated with a clock input 428, and level detecting circuitry associated with a data input 430 and a data output 432.

Clock input 428 is connected to receive an inverted clock signal SCLbar from inverter 424, while data input 430 is connected to receive the output from AND gate 422. Flop 426 also has a reset input 434 that is connectable to receive the second reset signal RST2.

In operation, the falling edge of the clock signal SCL (at time t2 in FIGS. 2A–2G) is inverted by inverter 424 to form the rising edge of the inverted clock signal SCLbar which, in turn, causes the logic state of the output of AND gate 422 to be latched and output as the start signal START.

The logic state of the output of AND gate 422 is a logic high only when the output of flop 412 is a logic high (indicating an I²C start command) and the inverted data signal SDAbar is a logic high. As noted above, a valid (non-glitch) data signal SDA is always low during the next falling transition of the clock signal SCL. As a result, the data signal SDAbar is always a logic high during the next falling transition of the clock signal SCL when the data signal is valid.

Thus, the start signal START is output as a logic high (a valid I²C start command) when the data signal SDA falls while the clock signal SCL is a logic high, and the data signal SDA has a logic low on the next falling edge of the clock signal SCL.

As further shown in FIG. 4, first logic circuit 150 of reset circuit 140 is implemented with a NOR gate 440 which has an input connected to the master reset signal MRST, and an input connected to the start signal START.

In operation, NOR gate 440 sets the logic state of the first reset signal RST1 to a logic low to reset flop 412 when the start signal START is a logic high (at time t3 in FIGS. 2A–2G) or the master reset signal MRST is a logic high.

In addition, second logic circuit 152 of reset circuit 140 is implemented with a NOR gate 442 which has an input connected to the master reset signal MRST, and an input connected to a flop output signal FLP.

Circuit 152 is also implemented with an edged-triggered flip-flop 444 that has edge detecting circuity associated with a clock input 446, and level detecting circuitry associated with a data input 448 and an output 450. Flop 444 also has a reset input 452 which is connected to receive an internal reset signal RST1.

Circuit 152 is further implemented with a NOR gate 454 that is connected to receive the stop signal STOP, the master reset signal MRST, and an intermediate signal IM from AND gate 422.

In operation, NOR gate 442 sets the logic state of the second reset signal RST2 to a logic low to reset flop 426 when the flop signal FLP is a logic high (at time t5 in FIGS. 2A–2G) or the master reset signal MRST is a logic high.

Flop 444 latches and outputs the logic state of the start signal START as the flop signal FLP on the rising edge of the clock signal SCL (at time t4 in FIGS. 2A–2G). Thus, the flop signal FLP is a logic high when the start signal START is a logic high on the rising edge of the clock signal SCL (at time t4).

In addition, NOR gate 454 sets the logic state of the internal reset signal RSTI to a logic low to reset flop 444 when either the master reset signal MRST, the intermediate signal IM, or the stop signal STOP is a logic high. Thus, the output of AND gate 422 causes flop 444 to be reset one-half a clock period before flop 444 latches and outputs the logic state of the start signal START.

Stop detecting circuit 160 is implemented with an inverter 456 that is connectable to receive the master reset signal MRST, and an inverter 458 that is connected to receive the start signal START. Circuit 160 is also implemented with an edge-triggered flipflop 460 which has edge detecting circuitry associated with a clock input 462, and level detecting circuitry associated with a data input 464 and a data output 466.

Clock input 462 is connectable to receive the data signal SDA, while data input 464 is connectable to receive the clock signal SCL. Flop 460 also has a first reset input 468 that is connected to the output of inverter 456, and a second reset input 470 that is connected to the output of inverter 458.

In operation, the rising edge of the data signal SDA causes the logic state of the clock signal SCL to be latched and output as the stop signal STOP. Flop 460 is also reset when the master reset signal MRST is a logic high, and when the start signal START is a logic high.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A start-stop detection circuit comprising:
   a first start detecting circuit connected to a clock line to receive a clock signal, and a data line to receive a data signal, the detecting circuit being connected to a first reset line to receive a first reset signal and to a first-step line to output a first-step signal;

a second start detecting circuit connected to the clock line to receive the clock signal, the second start detecting circuit being connected to the first-step line to receive the first-step signal, a second reset line to receive a second reset signal, and a start line to output a start signal;

a reset circuit connected to the clock line to receive the clock signal, and a master reset line to receive a master reset signal, the reset circuit being connected to the start line to receive the start signal, the first reset line to output the first reset signal, and the second reset line to output the second reset signal; and a stop detection circuit connected to the clock line to receive the clock signal, the data line to receive the data signal, and the reset line to receive the master reset signal, the stop detection circuit being connected to the start line to receive the start signal.

2. The circuit of claim 1 wherein the first start detecting circuit includes:

an edge detecting circuit that detects a high-to-low voltage transition on the data line; and a level detecting circuit that latches and outputs a logic state of the clock signal as a first-step signal when the edge detecting circuit detects the transition on the data line.

3. The circuit of claim 1 wherein the second start detecting circuit includes:

an edge detecting circuit that detects a high-to-low voltage transition on the clock line; and a level detecting circuit that latches and outputs a logic state of the first-step signal as a start signal when the edge detecting circuit of the second start detecting circuit detects the transition on the clock line.

4. The circuit of claim 1 wherein the reset circuit includes a first logic circuit that outputs the first reset signal when a logic state of the master reset signal indicates that a reset has been commanded, or a logic state of the start signal indicates that a valid I$^2$C start condition has been detected.

5. The circuit of claim 1 wherein the reset circuit includes a second logic circuit that outputs the second reset signal when a logic state of the master reset signal indicates that a reset has been commanded, or when, on a next rising edge of the clock signal, a logic state of the start signal indicates that a valid start condition has been detected.

6. The circuit of claim 1 wherein the stop detection circuit includes:

an edge detecting circuit that detects a low-to-high voltage transition on the data line, and a level detecting circuit that latches and outputs a logic state of the clock signal as a stop signal when the edge detecting circuit of the stop detecting circuit detects the low-to-high transition on the data line.

7. The circuit of claim 1 wherein the first start detecting circuit includes:

a first inverter connected to receive the data signal, the first inverter outputting an inverted data signal; and a first edge-triggered flip-flop having a clock input connected to receive the inverted data signal, a data input connected to receive the data signal, and a reset input connected to receive the first reset signal.

8. The circuit of claim 7 wherein the second start detecting circuit includes:

an AND gate connected to the outputs of the first inverter and the first flip-flop;

a second inverter connected to receive the clock signal, the second inverter outputting an inverted clock signal; and a second edge-triggered flip-flop having a clock input connected to a receive the inverted clock signal, a data input connected to the output of the AND gate, and a reset input connected to receive the second reset signal.

9. The circuit of claim 8 wherein the reset circuit includes:

a first logic circuit having a first NOR gate which has an input connected to the master reset signal, and an input connected to the start signal; and a second logic circuit having:

a second NOR gate which has an input connected to the master reset signal, and an input connected to receive a flop output signal, a third edge-triggered flip-flop that has a clock input connected to receive the clock signal, a data input connected to receive the start signal, and a reset input connected to receive an internal reset signal, and a third NOR gate connected to receive the stop signal, the master reset signal, and an intermediate signal from the AND gate, and connected to output the internal reset signal.

10. The circuit of claim 9 wherein the stop detecting circuit includes:

a third inverter connected to receive the master reset signal;

a fourth inverter connected to receive the start signal; and a fourth edge-triggered flip-flop having a clock input connected to receive the data signal, a data input connected to receive the clock signal, a first reset input connected to an output of the third inverter, and a second reset input connected to an output of the fourth inverter.

11. A start-stop detection circuit comprising:

first edge detecting means for detecting a high-to-low voltage transition of a data signal;

first level detecting means for latching and outputting a logic state of a clock signal as a first-step signal when the first edge detecting means detects the transition of the data signal;

second edge detecting means for detecting a high-to-low voltage transition of the clock signal;

second level detecting means for latching and outputting a logic state of the first-step signal as a start signal when the second edge detecting means detects the transition of the clock signal;

first logic means for outputting a first reset signal when a logic state of a master reset signal indicates that a reset has been commanded, or a logic state of the start signal indicates that a valid I$^2$C start condition has been detected, the first reset signal resetting the first level detecting means;

second logic means for outputting a second reset signal when a logic state of the master reset signal indicates that a reset has been commanded, or when, on a next rising edge of the clock signal, a logic state of the start signal indicates that a valid start condition has been detected, the second reset signal resetting the second level detecting means;

third edge detecting means for detecting a low-to-high voltage transition of the data signal; and third level detecting means for latching and outputting a logic state of the clock signal as a stop signal when the third edge detecting means detects the low-to-high transition of the data signal.

12. A method for operating a start-stop detection circuit, the circuit comprising:

a first start detecting circuit connected to a clock line to receive a clock signal, and a data line to receive a data signal, the detecting circuit being connected to a first reset line to receive a first reset signal and to a first-step line to output a first-step signal;

a second start detecting circuit connected to the clock line to receive the clock signal, the second start detecting circuit being connected to the first-step line to receive the first-step signal, a second reset line to receive a second reset signal, and a start line to output a start signal;

a reset circuit which is connected to the clock line to receive the clock signal, and a master reset line to receive a master reset signal, the reset circuit being connected to the start line to receive the start signal, the first reset line to output the first reset signal, and the second reset line to output the second reset signal; and a stop detection circuit connected to the clock line to receive the clock signal, the data line to receive the data signal, and the reset line to receive the master reset signal, the stop detection circuit being connected to the start line to receive the start signal, the method comprising the steps of:

detecting a high-to-low voltage transition on the data line;

latching and outputting a logic state of the clock signal as a first-step signal when the high-to-low transition is detected on the data line;

detecting a high-to-low voltage transition on the clock line; and latching and outputting a logic state of the first-step signal as a start signal when the high-to-low transition is detected on the clock line.

* * * * *